(12) United States Patent
Disabatino

(10) Patent No.: US 7,681,608 B2
(45) Date of Patent: Mar. 23, 2010

(54) FELLING HEAD WITH OFFSET ARMS

(75) Inventor: Benjamin Disabatino, Brantford (CA)

(73) Assignee: John Deere Forestry, Inc., Moline, IL (US)

( * ) Notice: Subject to any disclaimer, the term of this patent is extended or adjusted under 35 U.S.C. 154(b) by 609 days.

(21) Appl. No.: 11/561,141

(22) Filed: Nov. 17, 2006

(65) Prior Publication Data

US 2007/0113925 A1     May 24, 2007

Related U.S. Application Data

(60) Provisional application No. 60/738,401, filed on Nov. 18, 2005.

(51) Int. Cl.
*A01G 23/08*     (2006.01)
(52) U.S. Cl. .................................. 144/4.1; 144/34.1
(58) Field of Classification Search ............... 144/4.1, 144/34.1, 24.12, 24.13; 414/226.02, 444, 414/450; 30/134, 228; 241/101.71, 101.73, 241/266
See application file for complete search history.

(56) References Cited

U.S. PATENT DOCUMENTS

| D412,334 S | 7/1999 | DiSabatino et al. |
| 6,152,201 A * | 11/2000 | Kurelek ............... 144/336 |
| 6,363,980 B1 * | 4/2002 | Kurelek ............... 144/4.1 |
| 6,374,877 B1 | 4/2002 | Wildey |
| 7,174,932 B2 | 2/2007 | Mauchlen |
| 7,237,584 B2 | 7/2007 | DiSabatino |
| 2006/0272742 A1 * | 12/2006 | Taillon ............... 144/4.1 |

OTHER PUBLICATIONS

Prior Art: Koehring Waterous, Anca International, Koehring Waterous 20" side cut disc saw felling head.

* cited by examiner

*Primary Examiner*—Shelley Self
(74) *Attorney, Agent, or Firm*—Quarles & Brady LLP

(57) ABSTRACT

The accumulator and harvesting arms in a front cut felling head are offset to one side of the machine so as to hold a bundle of cut trees more to one side than the other so as to create more room in front of the accumulator arms to the side of the bundle in which to cut and receive a freshly cut tree.

14 Claims, 23 Drawing Sheets

FELLING HEAD WITH OFFSET ARMS

CROSS-REFERENCE TO RELATED APPLICATION

This claims the benefit of U.S. Provisional Patent Application No. 60/738,401 filed Nov. 18, 2005.

STATEMENT CONCERNING FEDERALLY SPONSORED RESEARCH OR DEVELOPMENT

Not applicable.

FIELD OF THE INVENTION

This invention relates to forestry equipment, and in particular to felling heads.

BACKGROUND OF THE INVENTION

Feller bunchers having felling heads for cutting and accumulating cut trees are well known in forestry operations. Most of them are front cut heads with the head mounted on either the front of a drive to tree vehicle or on the front of a vehicle mounted boom in the case of a boom to tree machine. There have been two basic approaches to accumulating arm geometries in such machines in the past. One approach is dual symmetric arms. These would accumulate the first tree in the middle of the head. These provide good control and power, are suitable for larger trees, and can be used to pick up trees off of the ground, but limit the space available in front of the arms to cut subsequent trees as the head is fed forwardly through the tree during the cutting operation. More recently, single accumulator arm designs have been used, particularly for felling heads that are designed to accumulate larger numbers of smaller trees. The single arm permits the trees to be accumulated off of the center of the head, and thus permits more variety in the shape of the accumulating area, and generally larger accumulation areas. The single arm is not as effective in controlling one or two very large trees, however, and cannot be used for picking up cut trees off of the ground.

SUMMARY OF THE INVENTION

The present invention provides a front cut felling head for a drive to tree or boom to tree feller buncher with an accumulation area that is offset from the center of the head, but still retains the ability to control large trees, even a single very large tree, and to pick up cut trees off of the ground. A large accumulation felling head is therefore provided that can be used with a variety of tree sizes.

A felling head of the invention has an arm design that allows more efficient use of the accumulation area. In a design of the invention, two accumulating arms are provided to accumulate cut trees off of the center of the head. The arm on one side is offset rearwardly and toward the center of the head, and the arm on the other side is offset away from the center of the head. Preferably, the arm set (including both arms), is rotated such that the tree is drawn back into the pocket and offset to one side of the pocket, toward one side of the space between the arms. Since the first tree cut is to one side of the pocket, more room is left on the butt plate outward of the accumulator arms to allow for subsequent cutting of more and larger trees. Prior link-synchronized arms tended to position the accumulated trees centered in the accumulation pocket. Doing this limited the room available to cut subsequent trees, as there wasn't enough room left on the butt plate to fit other trees, especially if the first accumulated trees were quite large. The present invention positions the accumulated trees offset from the center of gravity using two accumulating arms that leave as much room as possible for the cutting of more trees off center of the accumulated bunch as the head is fed forwardly through the tree.

Because the accumulated trees are to one side of the pocket in a head of the invention, the harvesting arms need to accommodate this repositioning of the load. This is accomplished by making the harvesting arm on the side where the trees are accumulated with more curvature on the side holding the trees, to reach further outwardly before turning inwardly to clear the accumulated trees, thus not disrupting the bunched trees. The opposing harvesting arm is straighter for pushing the cut trees towards the accumulating side. This design allows the arm to be synchronized for picking up trees on the ground, and also allows both harvesting arms to engage the accumulated trees for more hold and control while swinging the head or traveling with trees in the pocket.

The accumulating arms are also shaped non-symmetrically like the harvesting arms, with the accumulating arm on the accumulating side having more curvature on the tree holding side than the accumulating arm on the other side. The two sets of arms preferably have mating shapes so that the accumulated tree or trees are not disrupted when they are held by one of the sets of arms and the other set of arms is closed over it or them.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 9 shows the harvesting arms clamped around a large tree;

FIG. 10 shows the accumulating arms clamped around a large tree;

FIG. 11 shows the harvesting arms clamped around a smaller tree;

FIG. 12 shows the accumulating arms clamped around the tree size of FIG. 11;

FIG. 13 shows the harvesting arms clamped around a medium-sized tree;

FIG. 14 shows the accumulating arms clamped around the tree size of FIG. 13;

FIG. 15 shows the harvesting arms clamped around a smaller-sized tree;

FIG. 16 shows the accumulating arms clamped around the tree size of FIG. 15;

FIG. 17 shows the harvesting arms clamped around the smallest tree size of the sizes illustrated;

FIG. 18 shows the accumulating arms clamped around the tree size of FIG. 17;

FIG. 19 is a view like FIG. 18 but with a horn phantomed in;

FIG. 20 is a view showing both sets of arms with three medium-sized trees accumulated by the accumulating arms and one medium-sized tree being held by the harvesting arms;

FIG. 21 is a view like FIG. 20 but with various sizes accumulated, including two larger trees, one smaller tree, and an additional tree being cut.

DETAILED DESCRIPTION OF THE PREFERRED EMBODIMENT

Figure 1A:
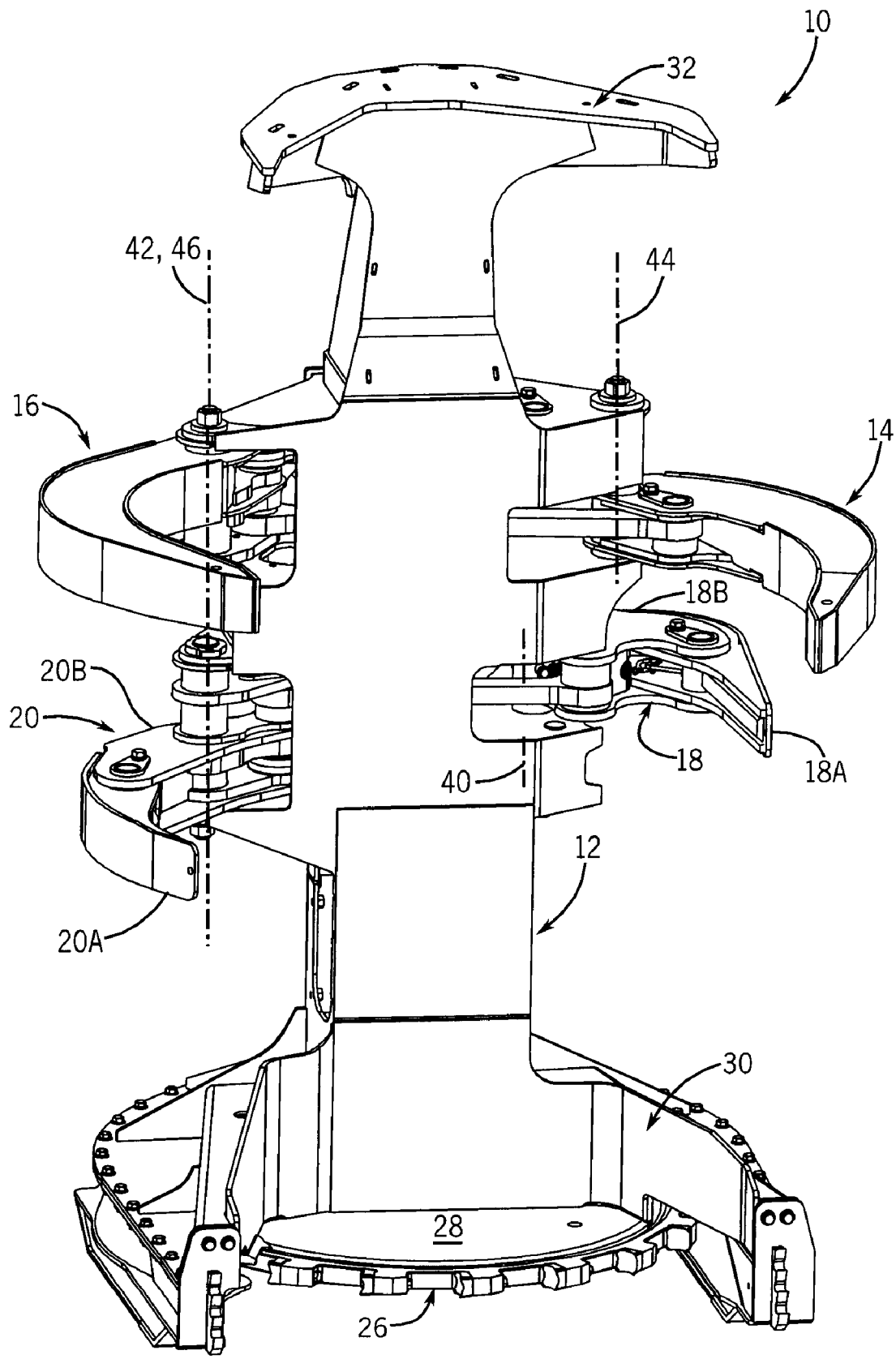
FIG. 1A is a perspective view of a felling head incorporating the invention.
Figure 1B:
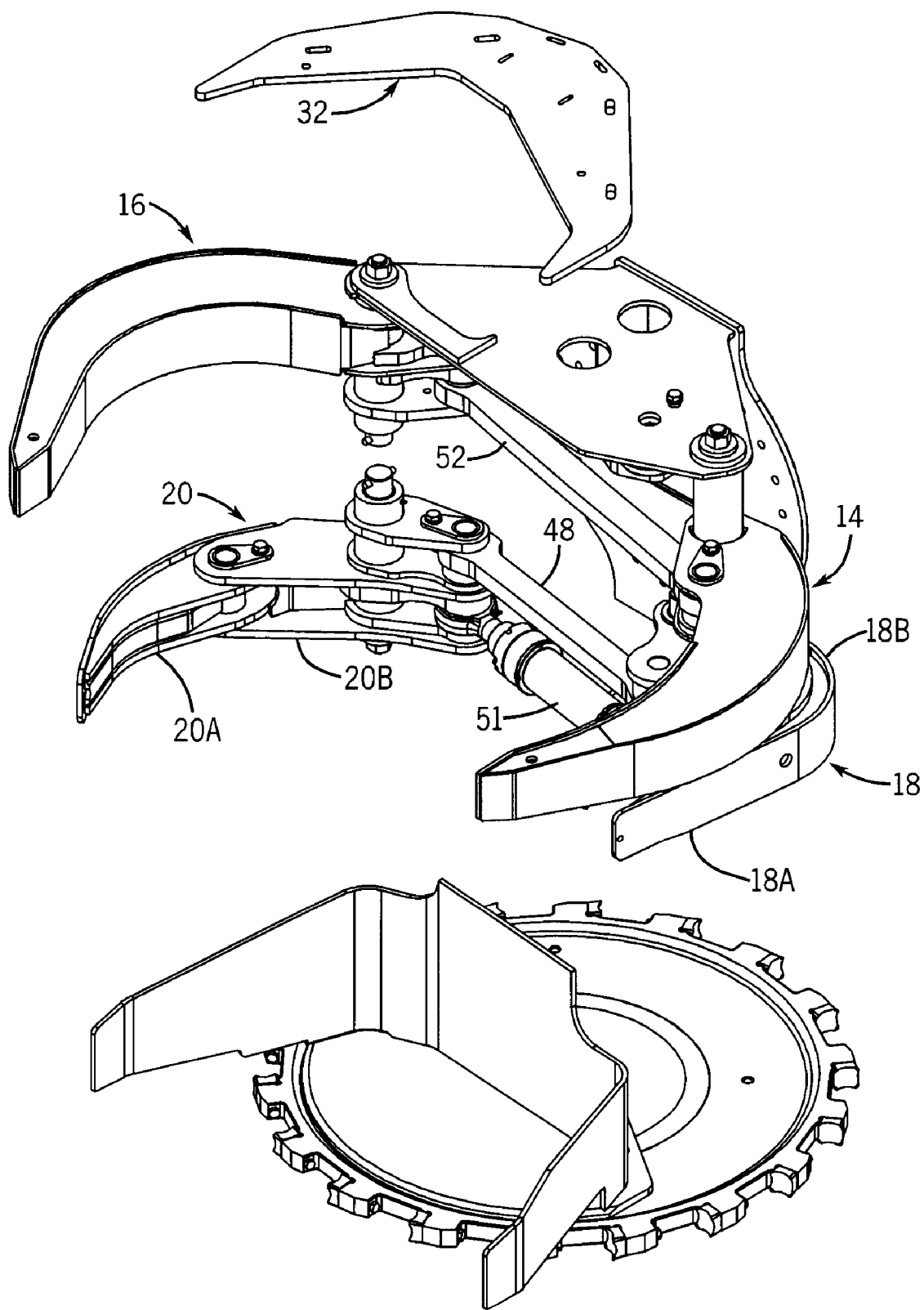
FIG. 1B is a top perspective view of the head of FIG. 1A with certain parts removed to reveal the arms and other parts.
Figure 1C:
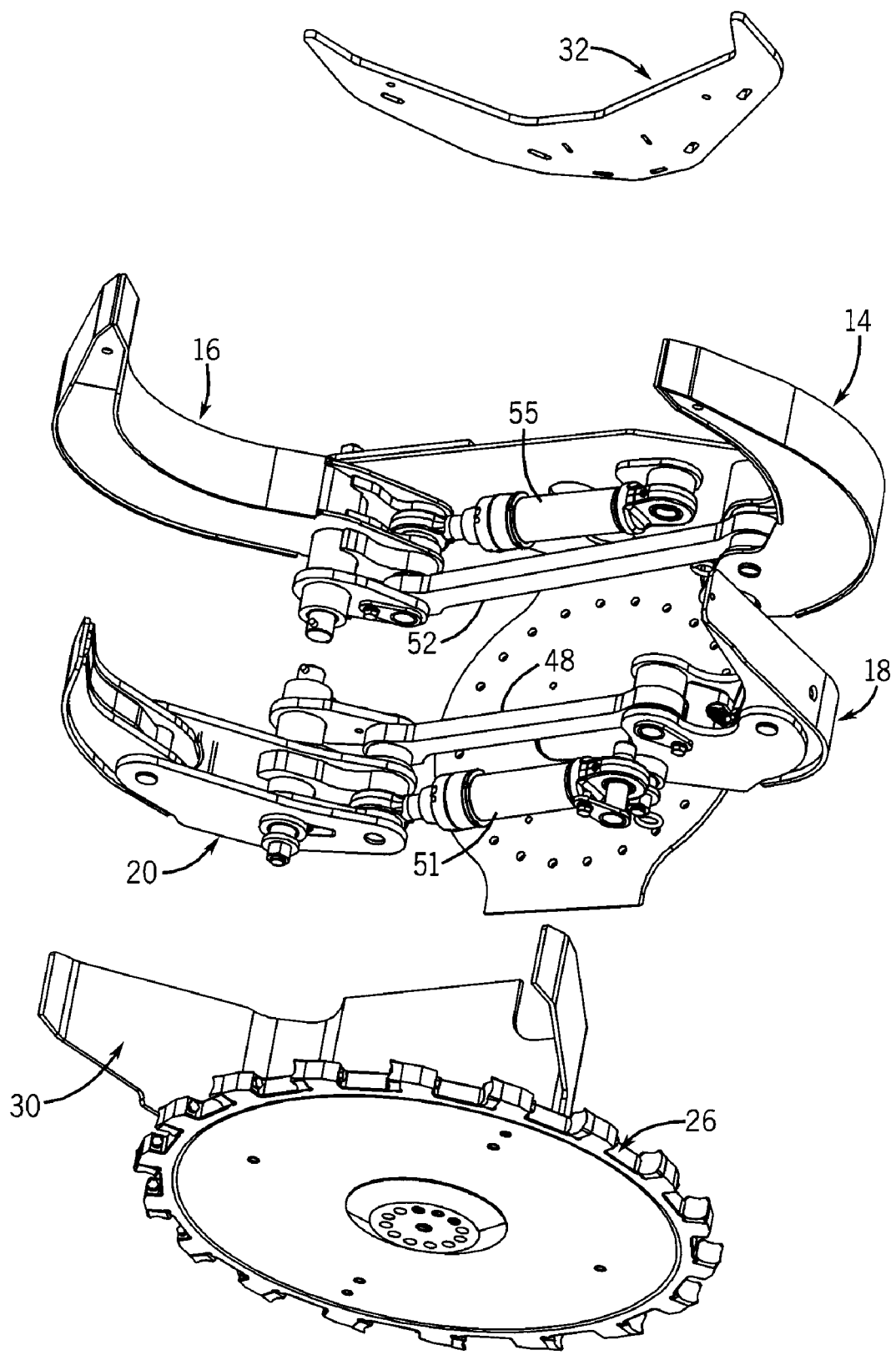
FIG. 1C is a bottom perspective view of the head of FIG. 1A with certain parts removed to reveal the arms and other parts.
Figure 2:
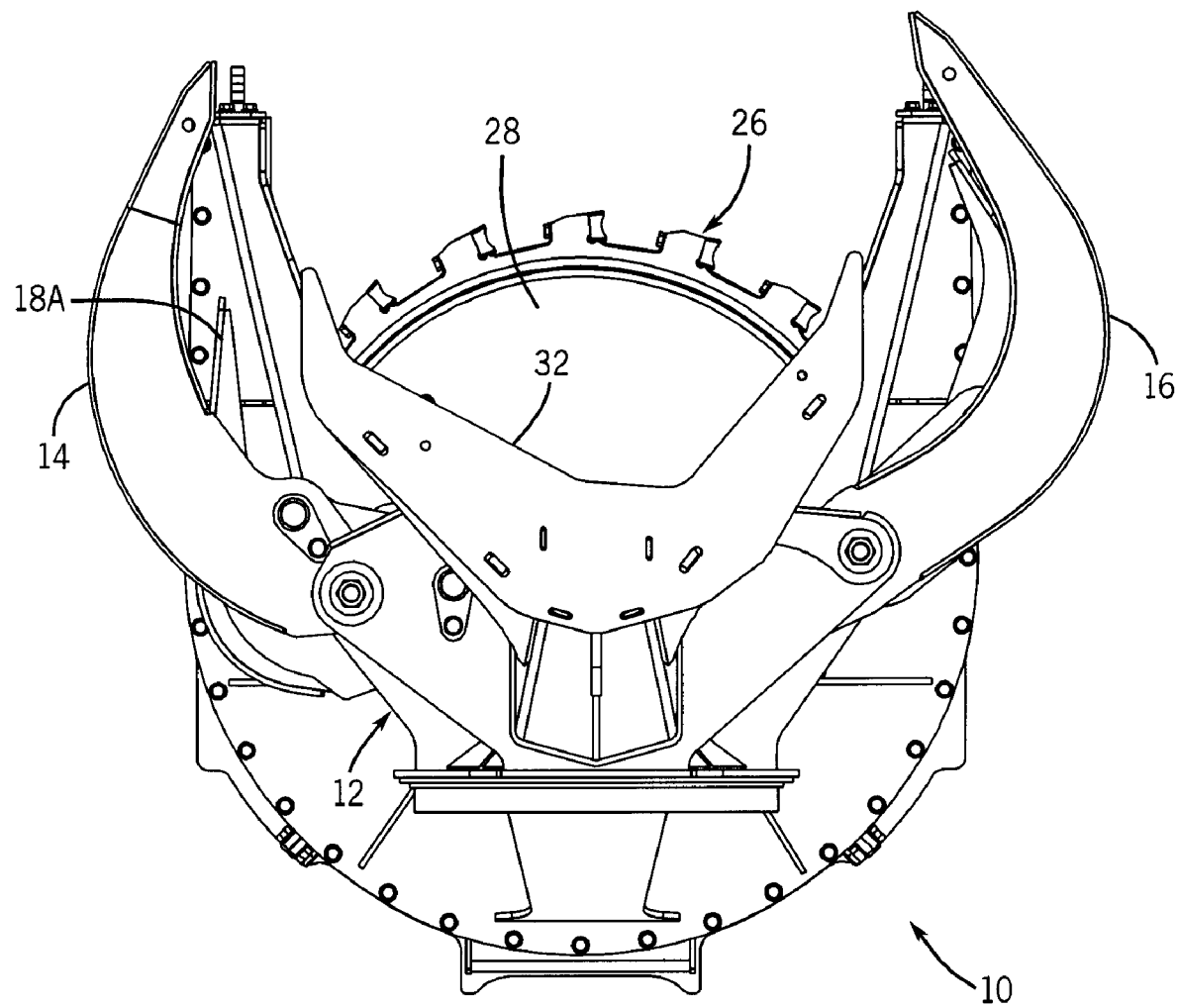
FIG. 2 is a top plan view of the felling head of FIG. 1A.
Figure 3:
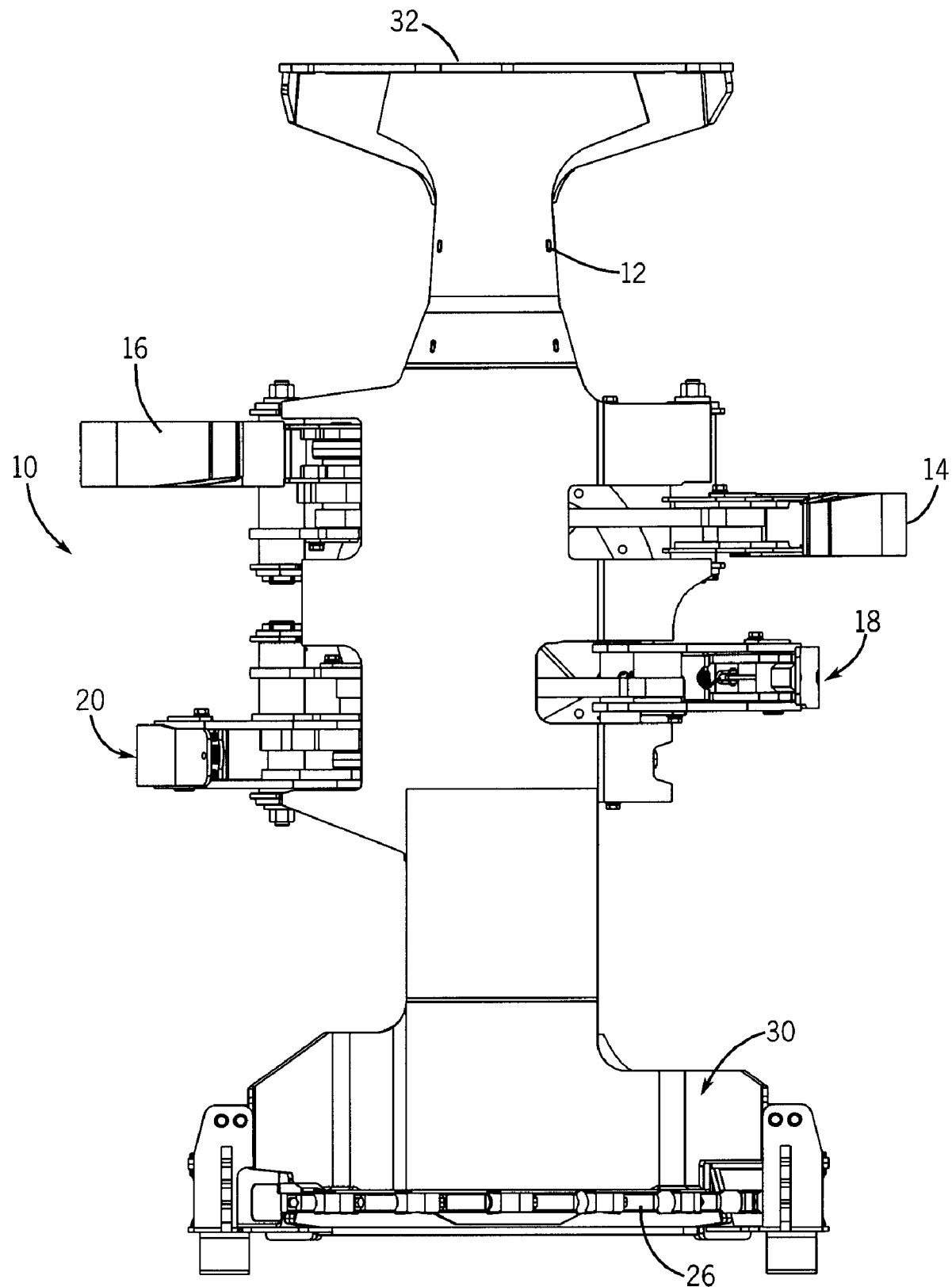
FIG. 3 is a front plan view of the felling head of FIG. 1A.
Figure 4:
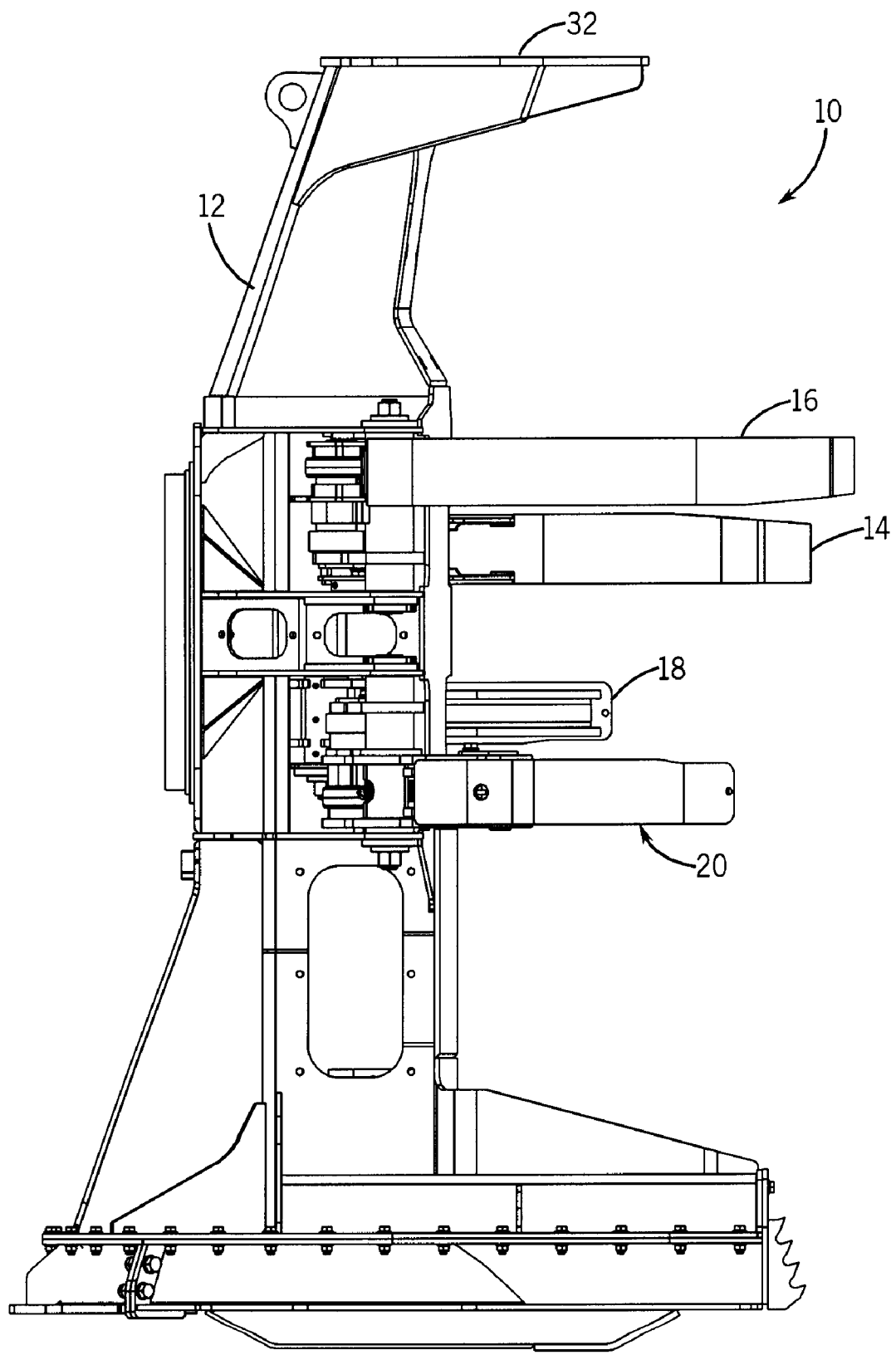
FIG. 4 is a side plan view of the felling head of FIG. 1A.
Figure 5:
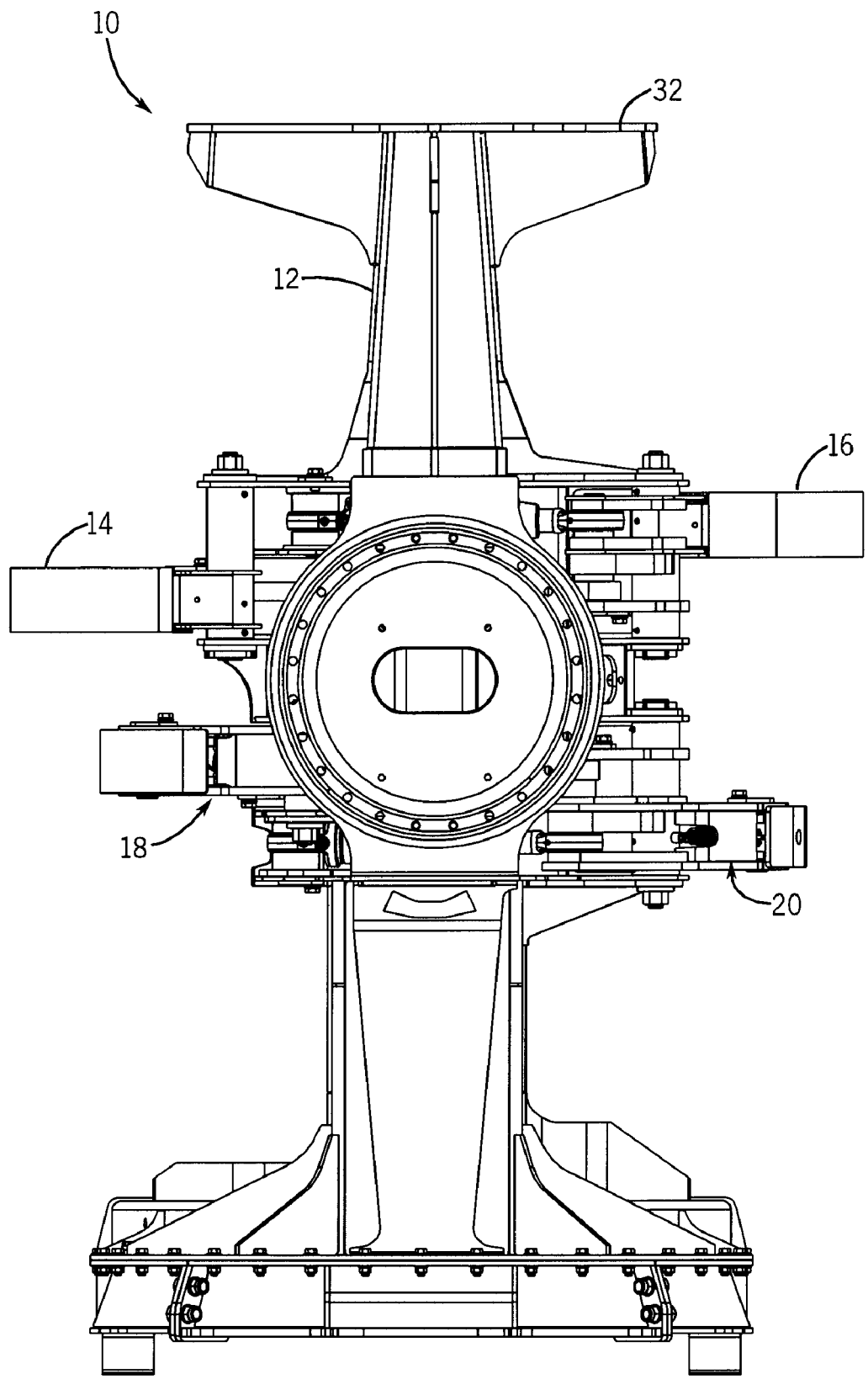
FIG. 5 is a rear plan view of the felling head of FIG. 1A.

Referring to FIGS. 1A-5, a front cut felling head 10 of the invention has a frame 12 that pivotally mounts a set of hydraulically-driven harvesting arms 14 and 16 and a set of hydraulically-driven accumulating arms 18 and 20. Each of the accumulating arms 18 and 20 has an outer arm 18A and 20A, respectively, and an inner arm 18B and 20B, respectively. The outer arms are held in the positions illustrated in FIGS. 1-5 by springs and can pivot relative to the respective inner arms so that they can be withdrawn from a bundle of trees to introduce the freshly cut tree to the bundle, and then the accumulating arms after having been withdrawn from the bundle are clamped back around the new bundle of trees, including the freshly cut tree. The outer arms 18A and 20A pivot relative to the respective inner arms 18B and 20B so that they can move out of the way behind the freshly cut tree, or else the freshly cut tree would block the withdrawal of the arms 18 and 20 from the bundle.

The head 10 has a cutting blade 26 that is driven by a motor (typically, hydraulic, not shown) and includes a plurality of peripherally-mounted cutting teeth at its outer perimeter, which when the blade 26 is driven rotatably cut a kerf in the tree to fell the tree. After the tree is fully cut, the harvesting arms 14 and 16 are closed to push the cut tree into the pocket, and hold it. The butt end of the tree moves onto butt plate 28, which is right above the blade 26, as the tree is being cut. With a high speed disc saw felling head as illustrated, the cut can be made extremely quickly and so the tree goes from being supported by the stump to being supported by the feller buncher very quickly.

The butt ends of the freshly cut trees of the accumulated trees are supported on the buttplate 28, but they are also tightly clamped by either the accumulating arms 18 and 20, the harvesting arms 14 and 16 or both sets of arms. For example, the first tree cut may be clamped by both sets of arms. Then, the harvesting arms are opened, while maintaining the accumulating arms closed around the first tree, to clamp on to the next tree to be cut. When that tree is cut, while maintaining the harvesting arms closed, the accumulating arms are opened and then reclosed around the bundle of two trees. This process is continued until the accumulating arms can hold no more trees, or there is no room in front of the accumulating arms to cut another tree.

Above the blade 26, the frame 12 defines a generally U-shaped area that is known as the pocket 30. The pocket 30 has walls that enclose the butt ends of the trees at the sides to restrain the butt ends from moving too much so that the trees cannot tip out of the frame 12. At the top end of the frame 12, the frame 12 has a horn 32 that serves a similar purpose above the two sets of arms. Thus, in general, the bundle of trees is restrained by one or both sets of arms, the pocket 30 and the horn 32, and may be supported on the buttplate 28.

Figure 6:
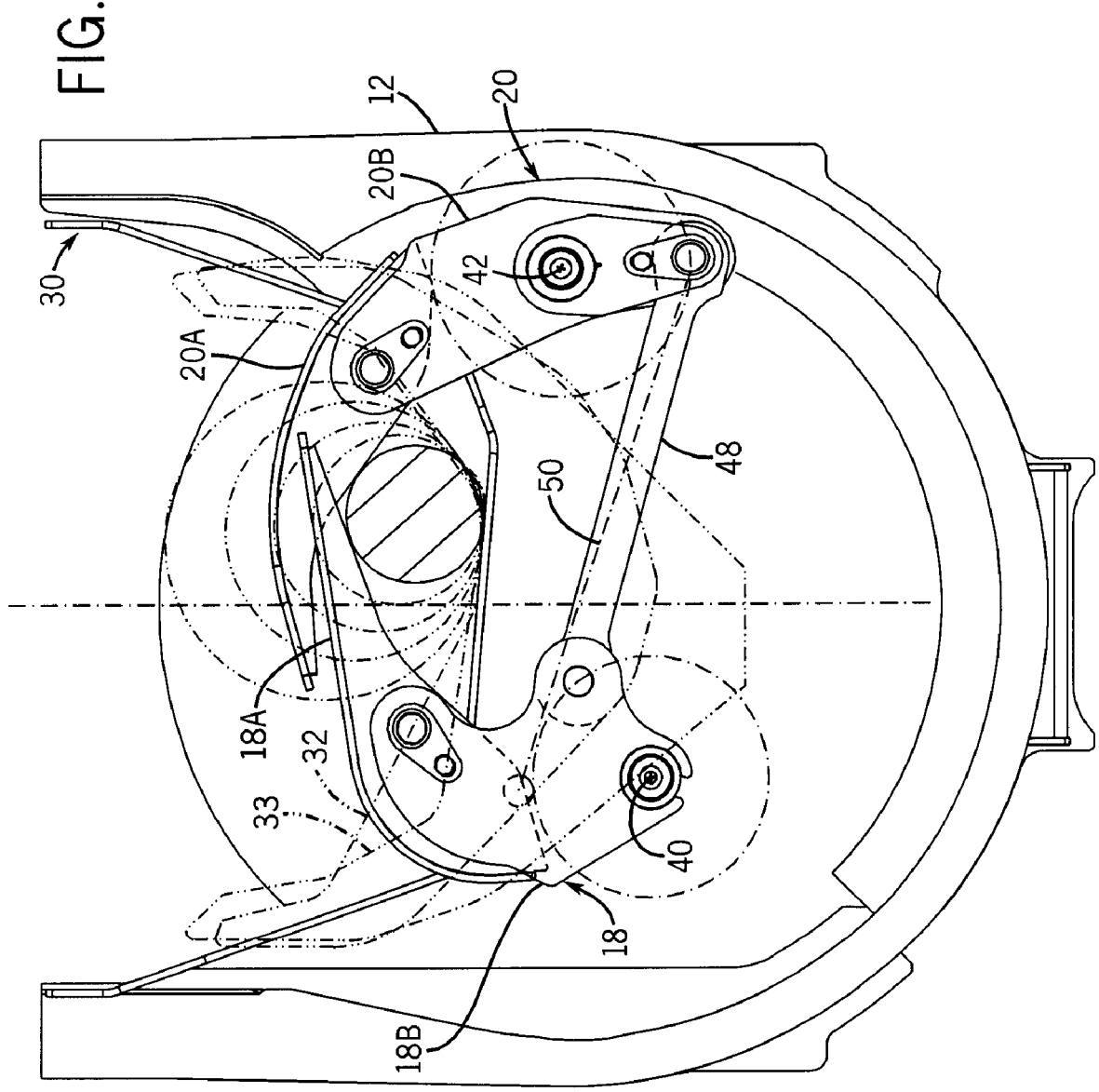
FIG. 6 is a top schematic plan view of the felling head of FIG. 1A showing in phantom a different horn shape and showing the accumulating arms but not the harvesting arms.

Referring to FIG. 6, a top schematic view of the felling head 10 is illustrated showing the horn 32 and an alternate horn 33 in phantom lines. While the horn 32 may be a preferred shape for many applications, the horn 33 shape was used to create FIGS. 7-21, which show the head in various conditions. The principles are the same, only the particular shape differs.

Figure 7:
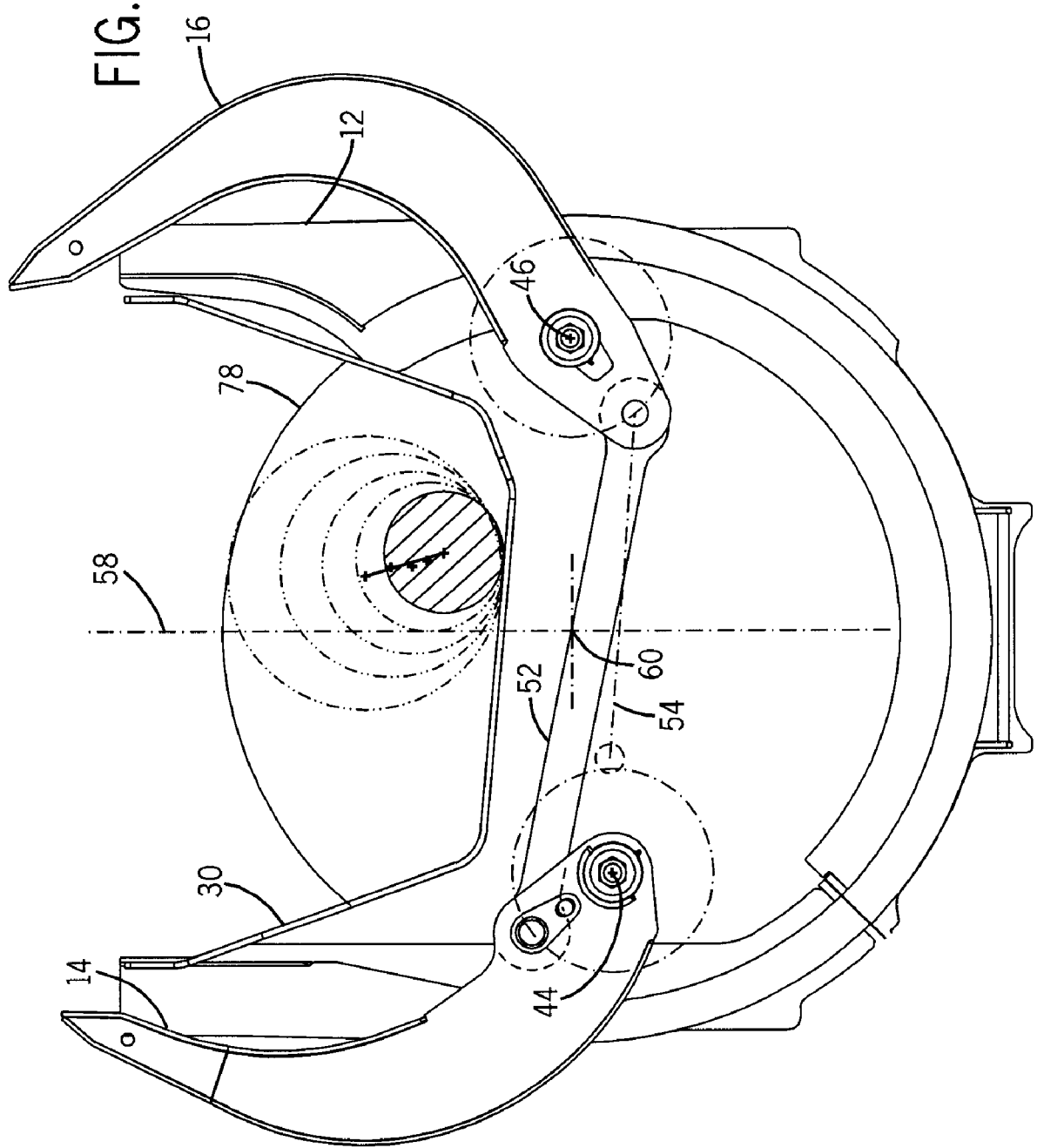
FIG. 7 is a top plan view of the felling head showing the harvesting arms but not the accumulating arms.
Figure 8:
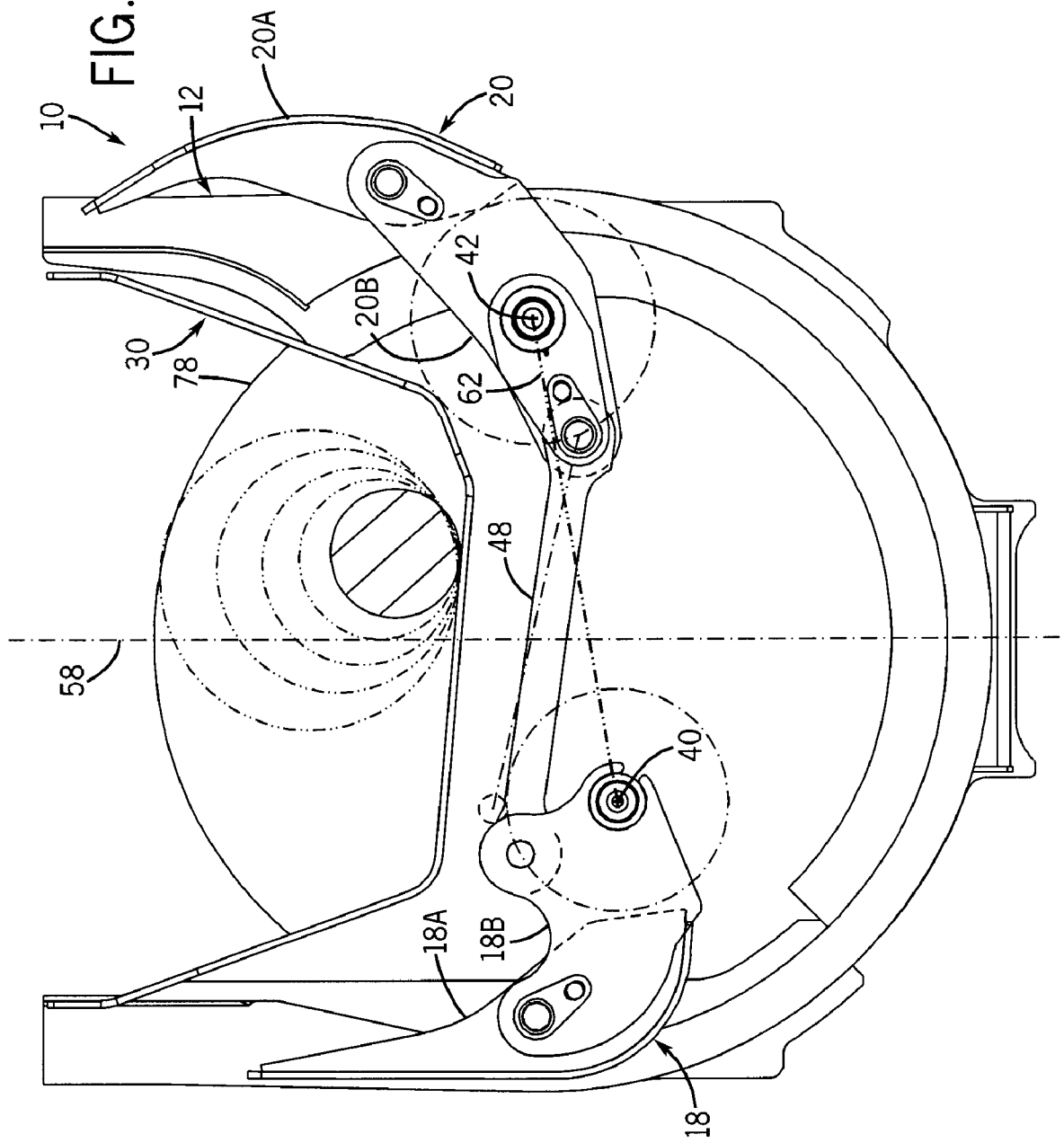
FIGS. 8-21 show the felling head and alternate between showing the accumulating arms or the harvesting arms, for various sized trees.

Referring to FIGS. 6-8, either the accumulating arms and the associated structures are shown or the harvesting arms and associated structures are shown. That is true for all of FIGS. 6-19. In the figures, various circles are shown, which indicate different tree diameters. FIG. 6 shows the accumulating arms closed around a tree of the smallest diameter for instance.

In the figures, the points about which the various arms are pivoted to the frame 12 are axis 40 for arm 18, axis 42 for arm 20, axis 44 for arm 14, and axis 46 for arm 16. A link 48 is pivotally connected between the inner arms 18B and 20B so that those arms move in synchronization. Axis 50 is the axis of a hydraulic actuator 51 that is pinned at one end to the frame 12 and at the other end to arm 20B, to cause both of the accumulating arms 18, 20 to move. Similarly, a link 52 is pinned with both ends pivotally attached to the arms 14 and 16 so that they also move in synchronization, and an axis 54 is the axis of a hydraulic actuator 55 having one end pinned to the frame 12 and the other end pivotally pinned to the arm 16 so that the harvesting arms 14 and 16 are moved by the cylinder 55. Both sets of arms are said to be link synchronized since the arms of each set, either the accumulating arm set 18, 20 or the harvesting arm set 14, 16, move in synchronization with one another, being restrained by the respective link 48 or 52.

FIG. 7 illustrates the harvesting arms wide open and FIG. 8 illustrates the accumulating arms wide open. In each figure, axis 58 indicates the center axis of the head 10 and the driving direction of the vehicle to which the head 10 is mounted, which goes through the axis about which the saw blade 26 rotates, and is the direction that the head 10 is fed through a tree during the cutting operation. The center about which the blade 26 rotates is indicated at point 60. The head 10 cuts trees from the front of the head and therefore is for a drive to tree feller buncher or a front cut boom to tree feller buncher, meaning that the head 10 is mounted to the front of a wheeled or tracked vehicle, or to a boom at the front of the vehicle, and the axis 58 is parallel or aligned with the forward or boom extension direction of the vehicle. Trees are cut at the front of the head 10, as that is the machine direction, whether the feller buncher is being driven forwardly during cutting or the boom, if the head 10 is boom mounted, is being extended.

The array of different sized trees illustrated are all accumulated off center relative to the axis 58. The centers of these trees are shown in FIG. 7, all being to the right of the axis 58. The first trees are each positioned in a spot such that one of the accumulating arms is tangent to the tree, and from the arrangement of the pivot axes of the arms, all of the tree centers are right of the central axis 58 of the head 10. The harvesting and accumulating arms on the left, or operator's view, side of the head 10 are shaped to push the trees over to the right side and the harvesting and accumulating arms on the right side are shaped so as to be more curved than the associated left side arms on their inner surfaces that hold the trees to make room to receive and accumulate the trees on the right side. From side to side, therefore, the arms of each pair are non-symmetrical. In addition, the axes of rotation 44 and 40 of the respective arms 14 and 18 on the operator's view (left) side of the head 10 are not coaxial. In addition, both sets of arms are shaped complimentarily to one another so as to minimize disruption or changing location or orientation of the tree or trees accumulated when being held by one set of arms and the other set of arms is closed over the accumulated tree or trees.

It addition, it is noted that trees are drawn into the pocket toward one side of the space between the arms of each pair of accumulator or harvesting arms. In other words, the center of the first tree drawn into the pocket will be to the right of a line drawn at the midpoint of a line between the two pivot points of the arms that is perpendicular to the line between the two pivot points. This is true for the accumulator arms and for the harvesting arms. Another way of saying this is that the center of the accumulation pocket is offset from the center of the space between both pairs of arms, or that trees are drawn to one side of the space between the pivot points of the arms.

Axis 58 represents the central axis of the head 10 in the direction of forward movement of the vehicle on which the head 10 is mounted, which may be a tracked or wheeled vehicle, with or without a boom on which the head may be mounted. If mounted on a boom, the forward longitudinal axis 58 is determined by the direction of forward extension of the boom, and if not mounted on a boom it is determined by the forward driving direction of the vehicle. Line 62 is a line drawn between the two centers 40 and 42, which are the pivot axes of the respective accumulating arms 18, 20. Line 62 is not at a right angle to the line 58, which if it were would appear horizontal in FIG. 8, but is rotated or angled from the perpendicular position to an obtuse or angled orientation relative to the line 58. This is because the pivot point 40 is further back than the pivot point 42, relative to axis 58 and the forward direction 58 of the head 10. This rotates the sweep zone of the set of accumulating arms 18 and 20 so that the arms pull the trees that they accumulate to the right side of the axis 58. It is preferable to pull them to the right side, because on most machines, the operator is sitting to the left of center so that the operator has a better view to the left side of the head than to the right side, as the post or frame 12 of the head can block the view to the right. Positioning the cut trees to the right of center creates more room on the left side of the head, the operator's view side, to cut a new tree. In addition, the center of the first accumulated tree is also to the right of a line drawn at the midpoint of line 62 and perpendicular to line 62, which results in the center of the pocket being offset from the center of the space between the pivot points of the two arms 18 and 20.

Figure 9:
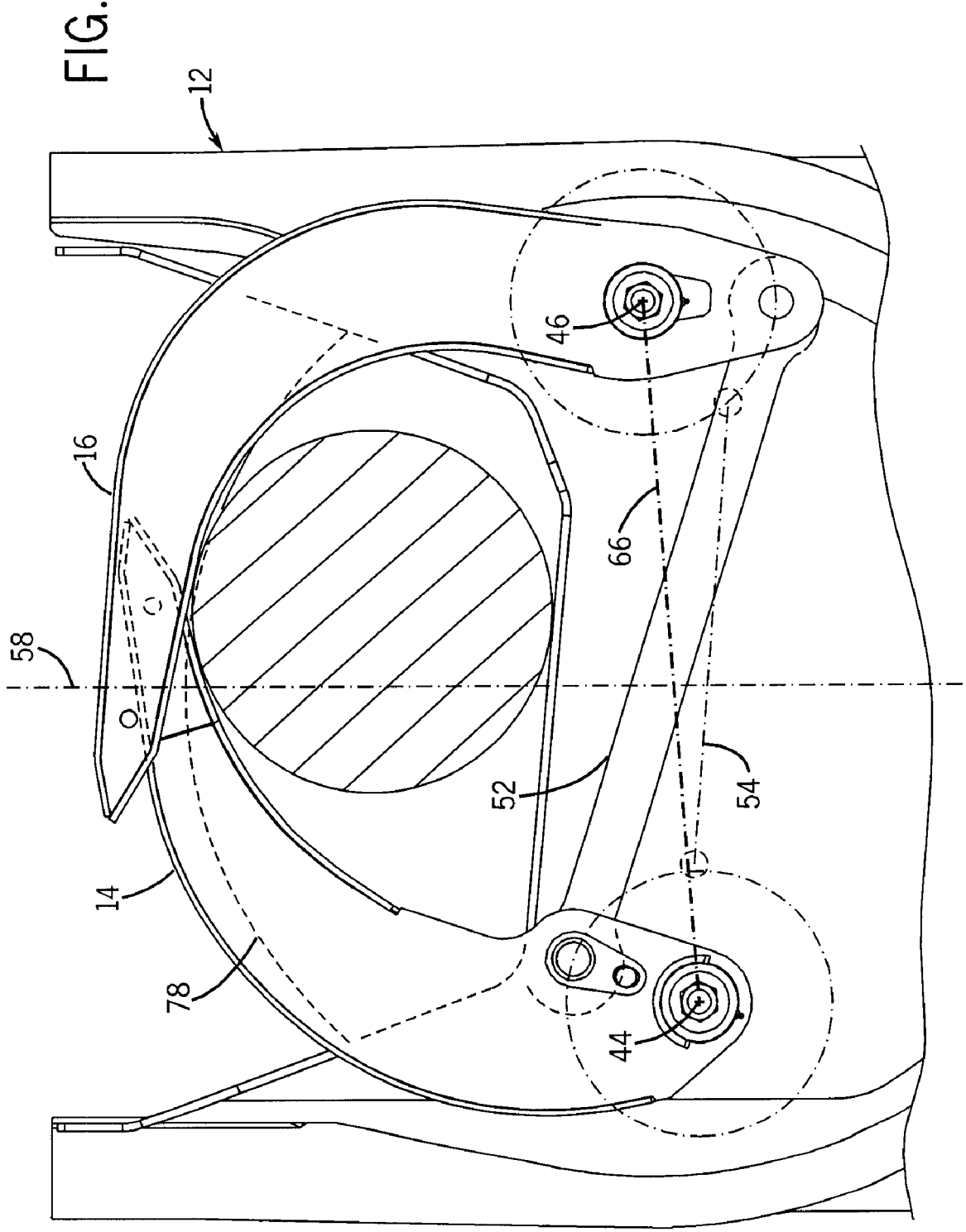

Referring to FIG. 9, a line 66 connects the pivot point centers 44 and 46. Line 66 is also at other than a right angle to the forward longitudinal axis 58 of the head 10 and vehicle to which it is mounted, so that the harvesting arms 14 and 16 also tend to pull trees being cut toward the accumulation area, which is mainly on the right side of the axis 58. In addition, the center of the first accumulated tree is also to the right of a line drawn perpendicular to line 66 at the midpoint of line 66, which results in the center of the pocket being offset from the center of the space between the pivot points of the two arms 14 and 16.

The pocket 30 and the horn 32 are both deeper on the right side of the axis 58 as well, which is also to the right of the above mentioned lines drawn perpendicular to the lines 62 and 66 at the midpoints of those lines. Which horn shape 32 or 33 is used is a fine point, with horn 32 being preferred, as with either, the trees will still be pulled to the right side of the central axis 58. The horn 32 shape is preferred since it tends to contact a single tree in the accumulation pocket on two sides rather than just one, for better stability.

Figure 10:
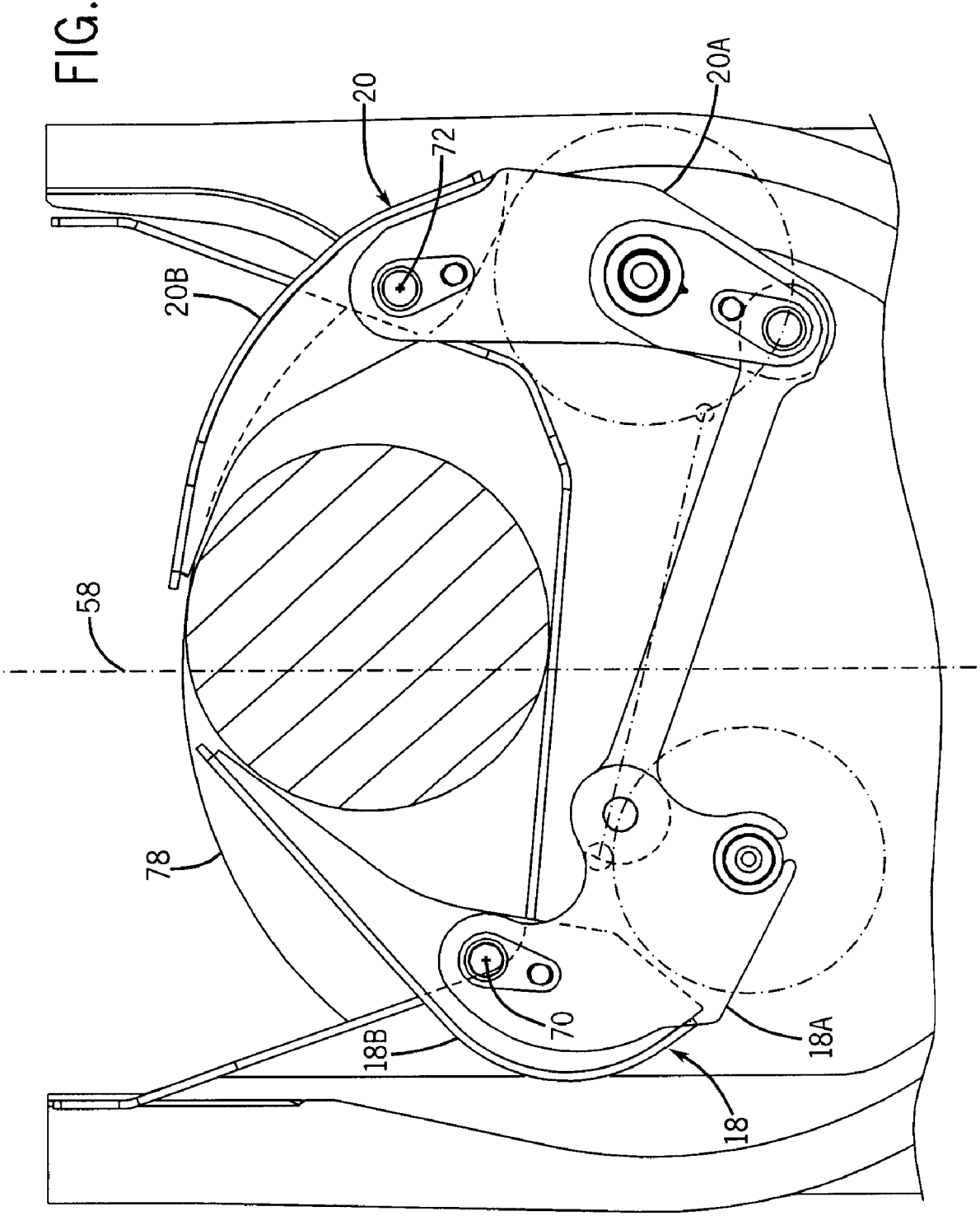
Figure 11:
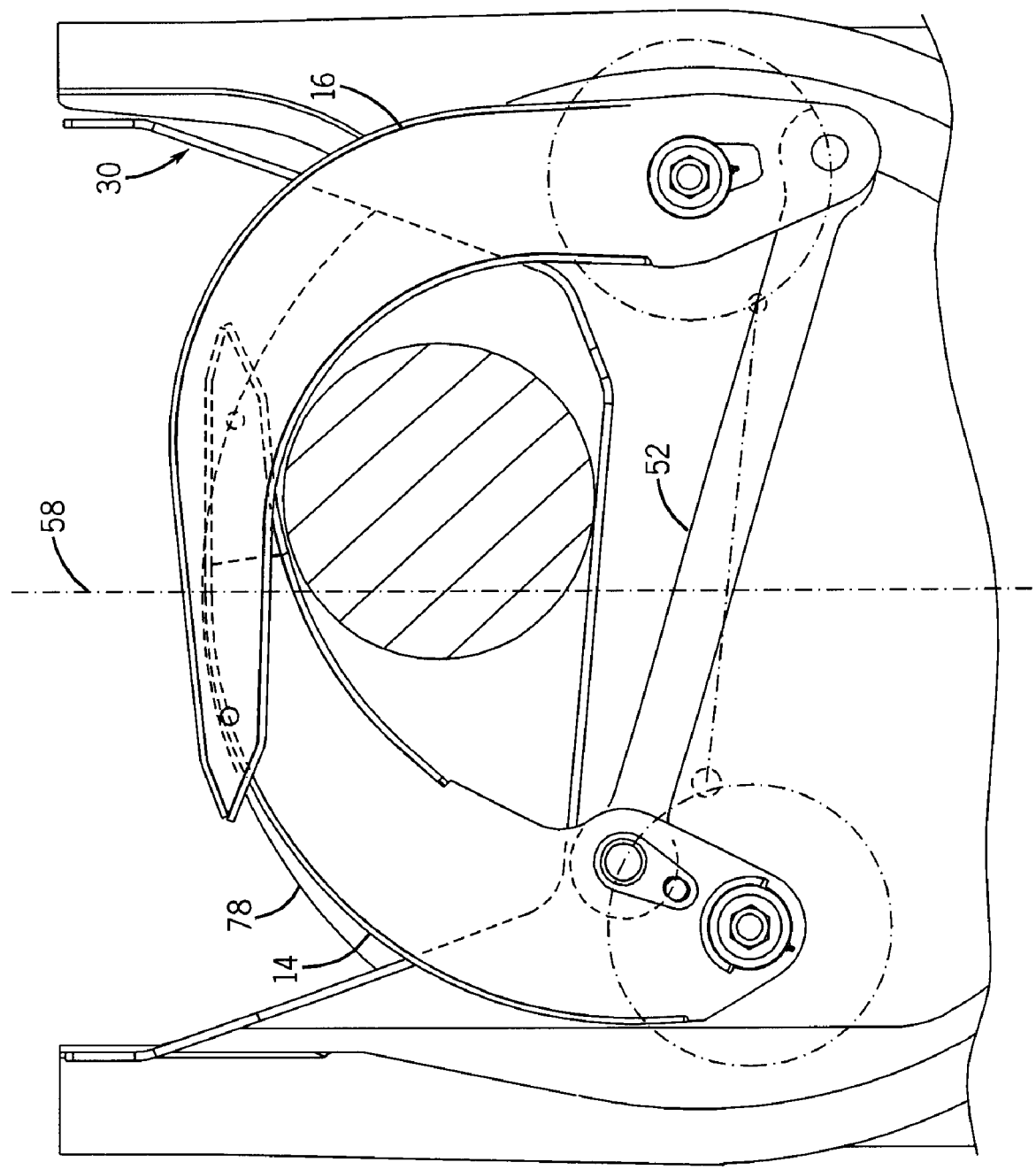
Figure 12:
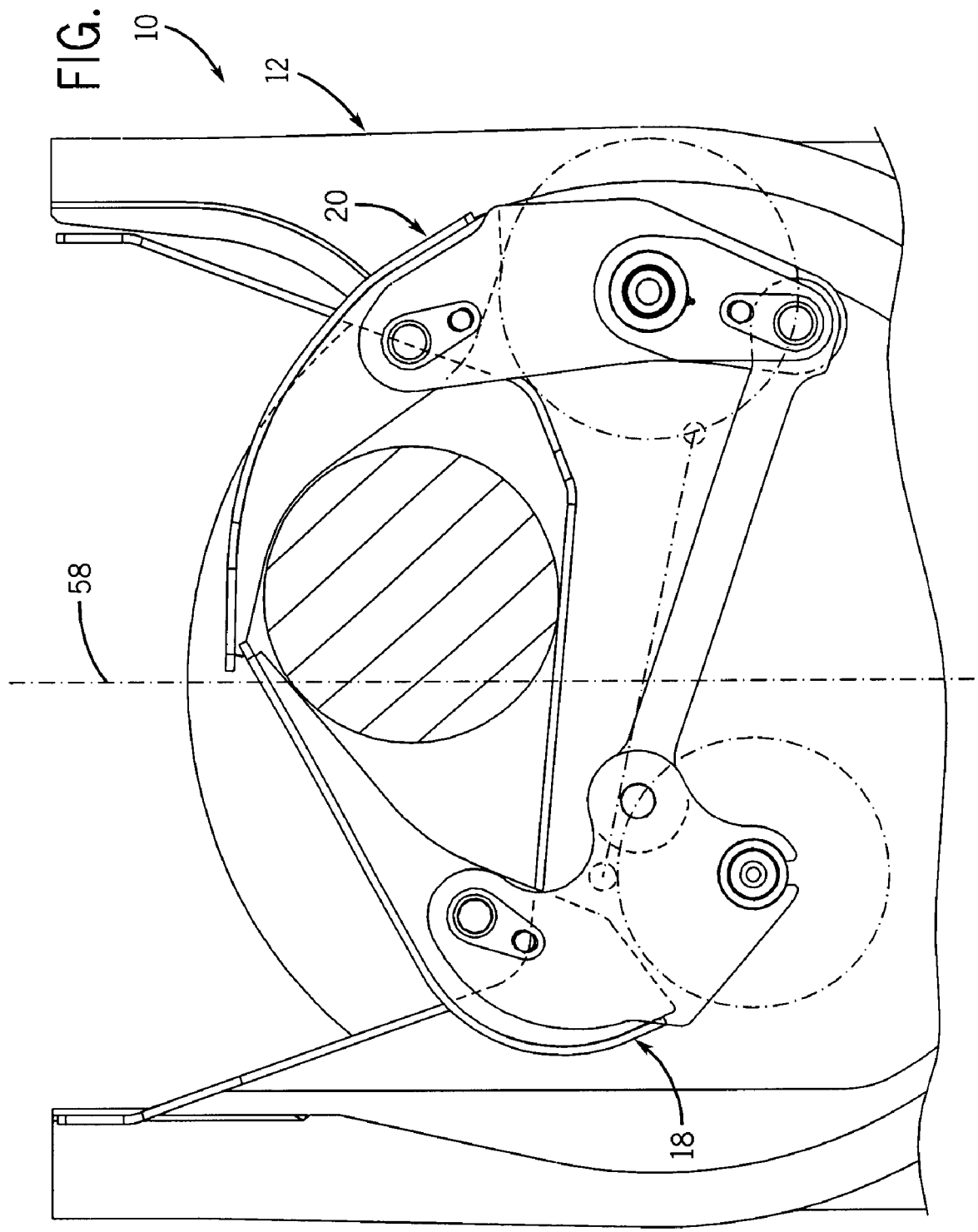
Figure 13:
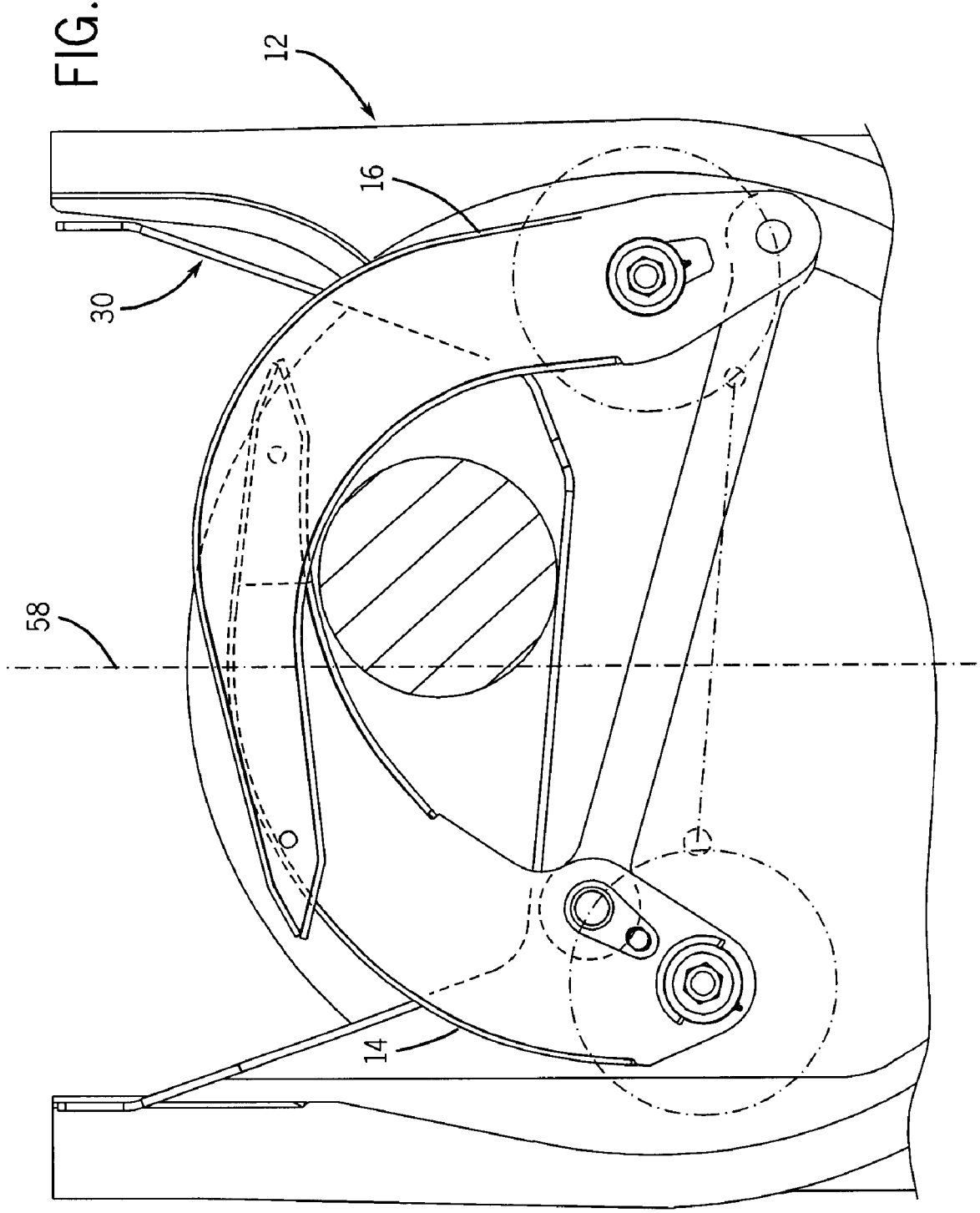
Figure 14:
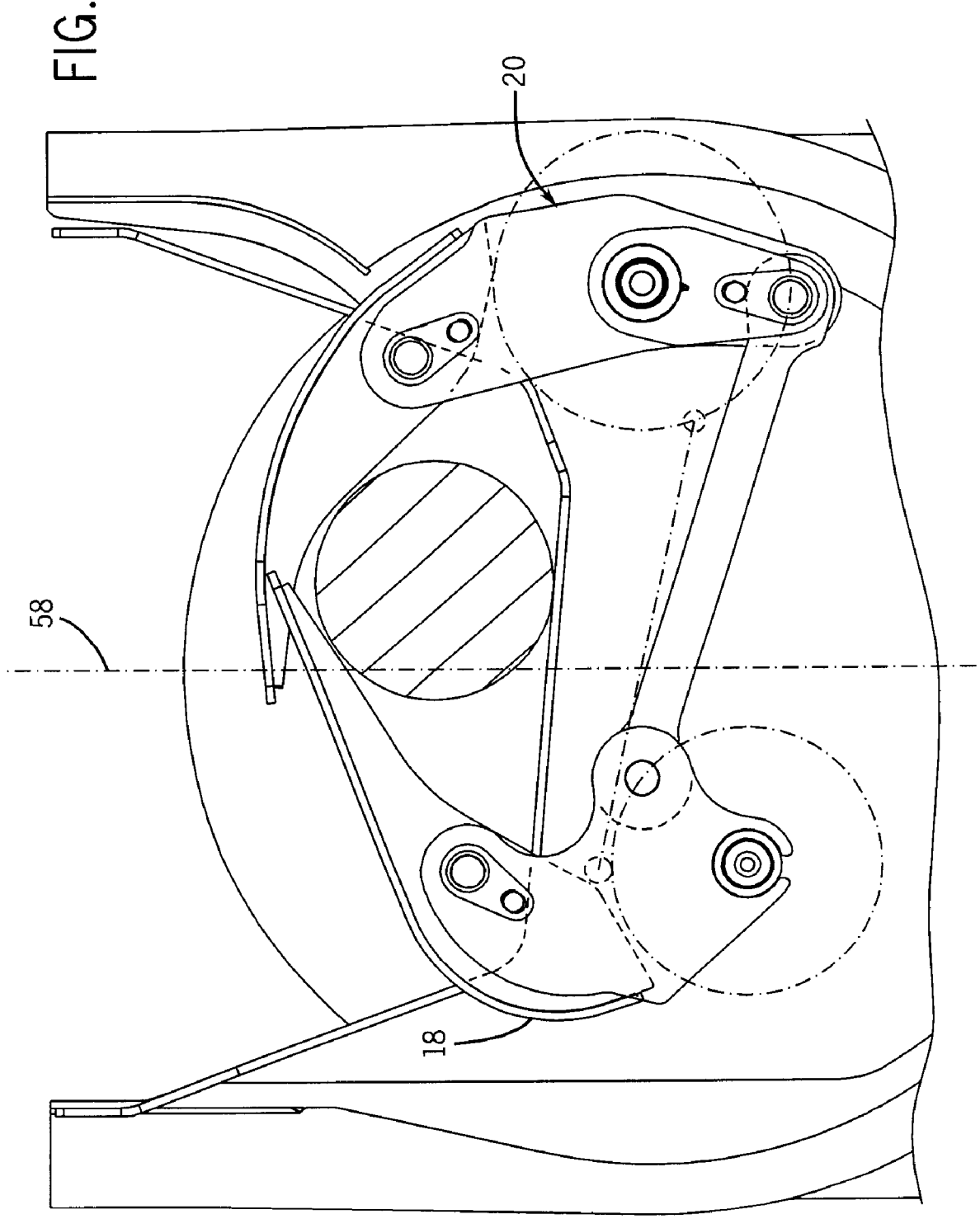
Figure 15:
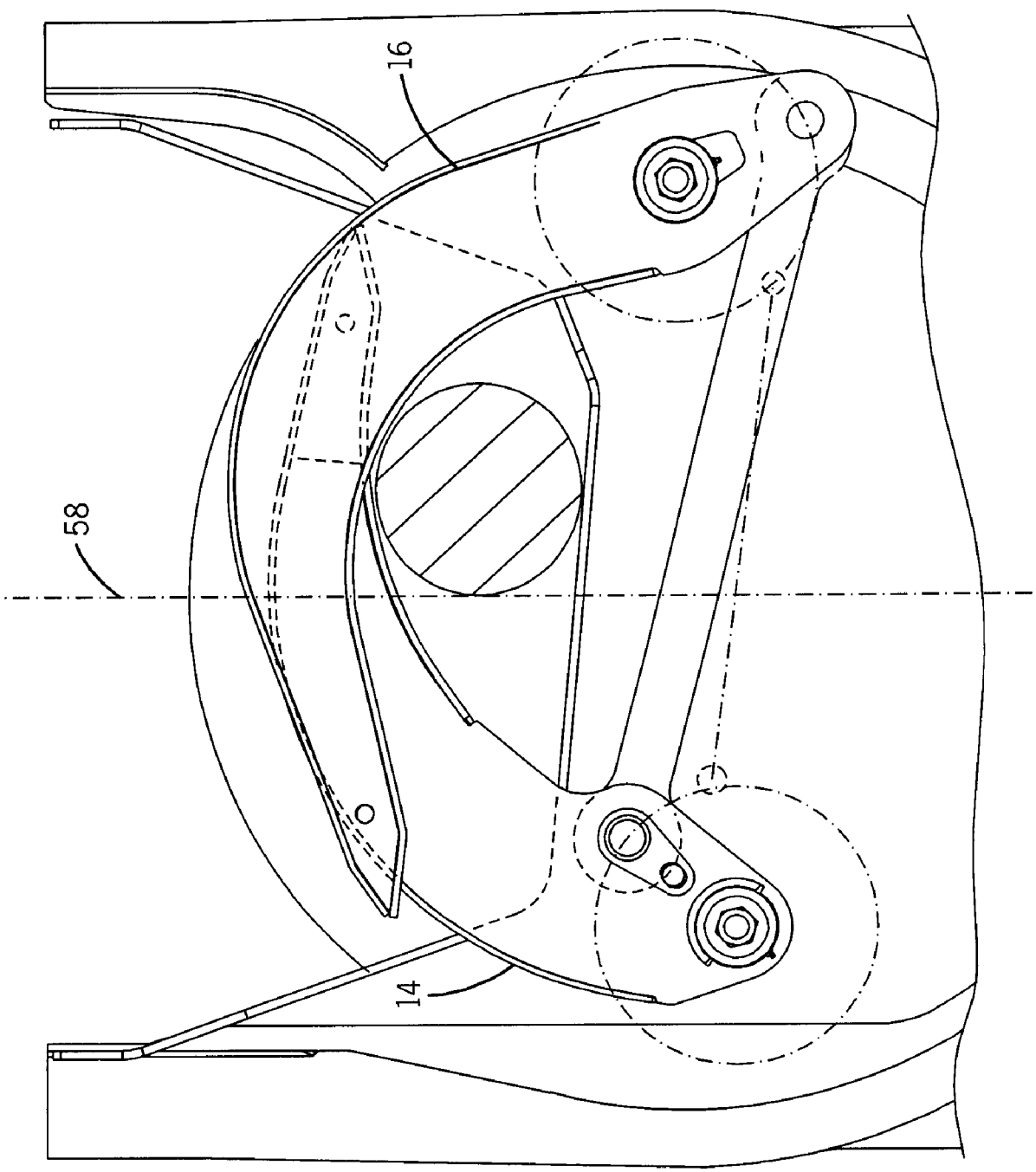
Figure 16:
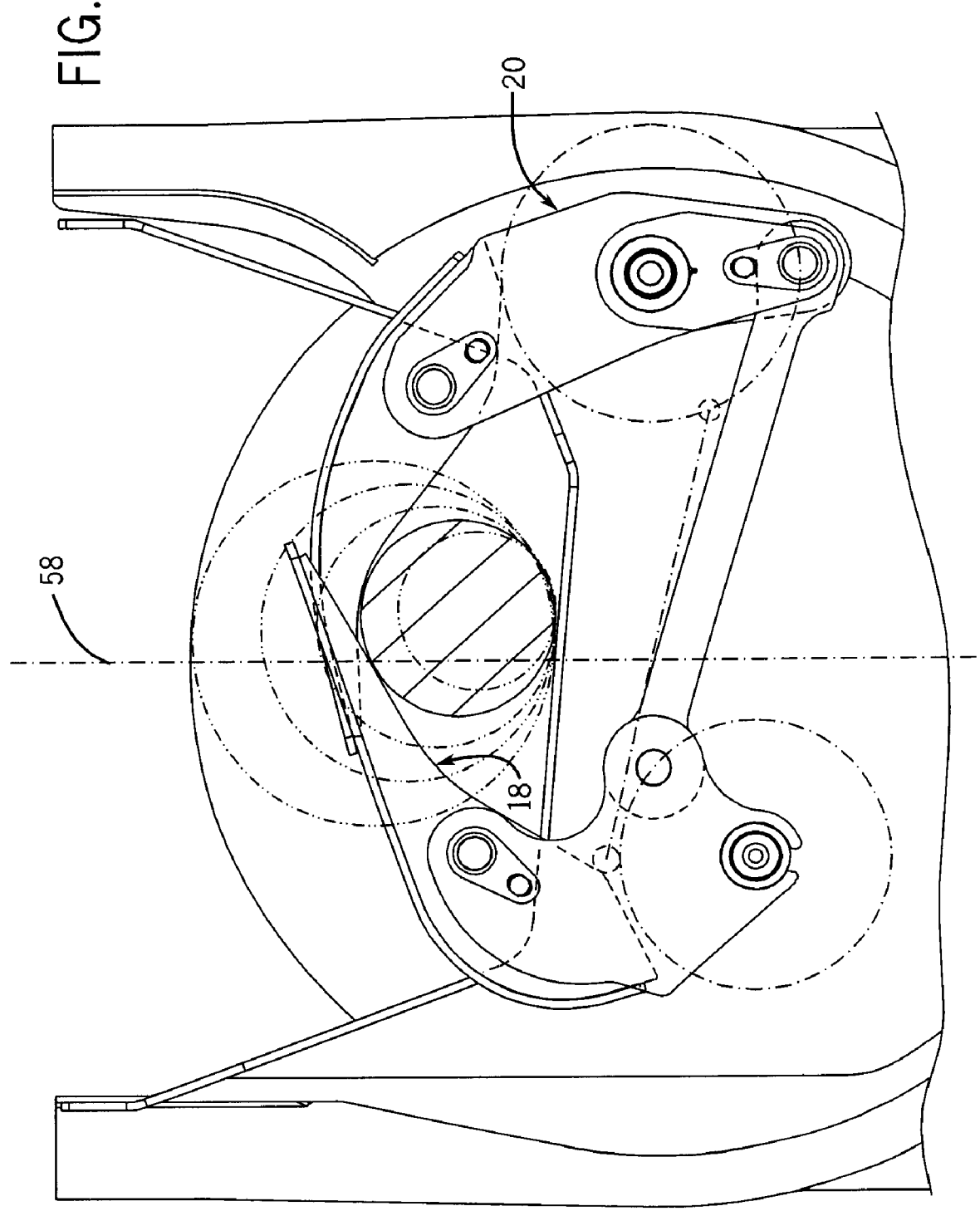
Figure 17:
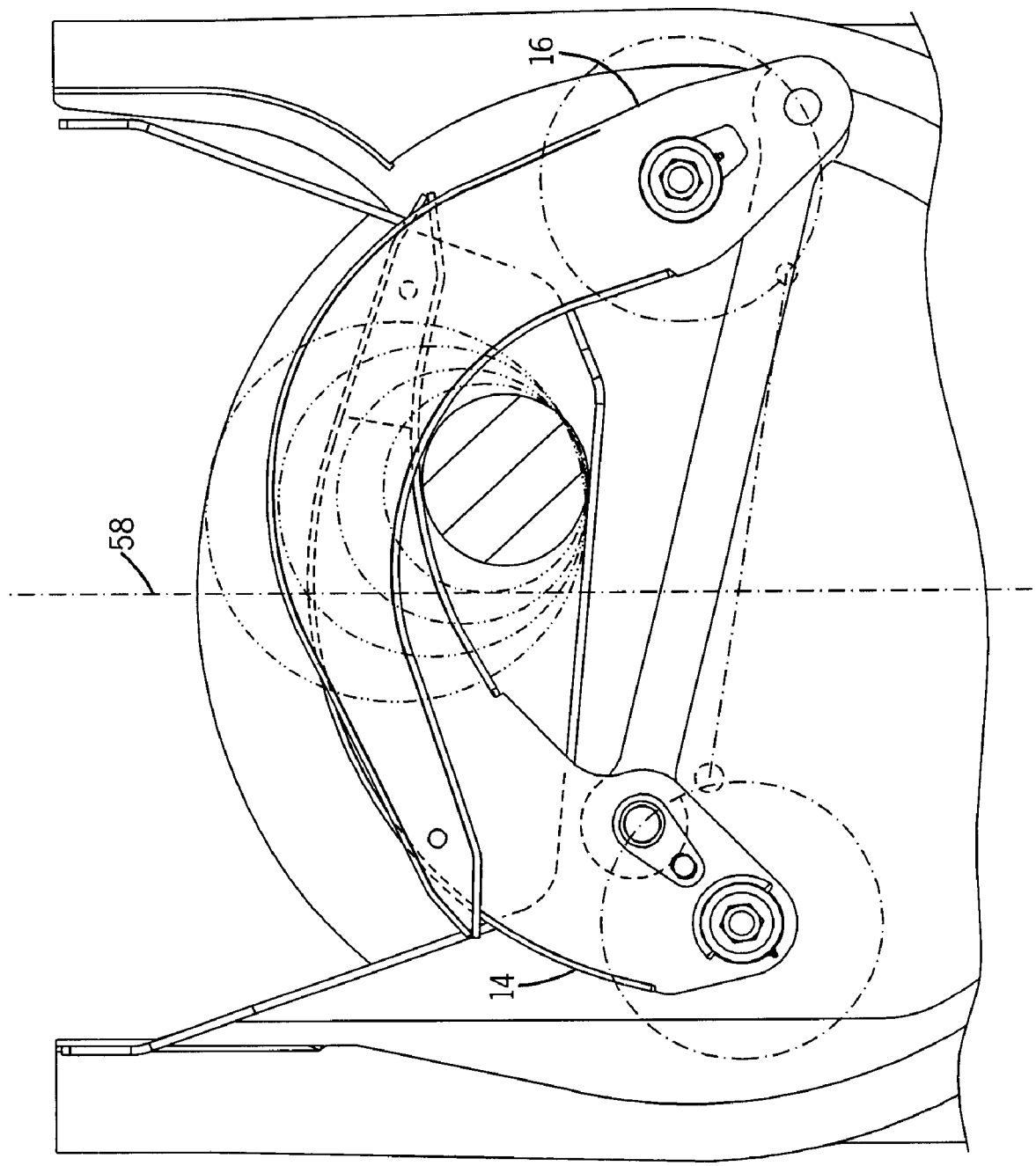
Figure 18:
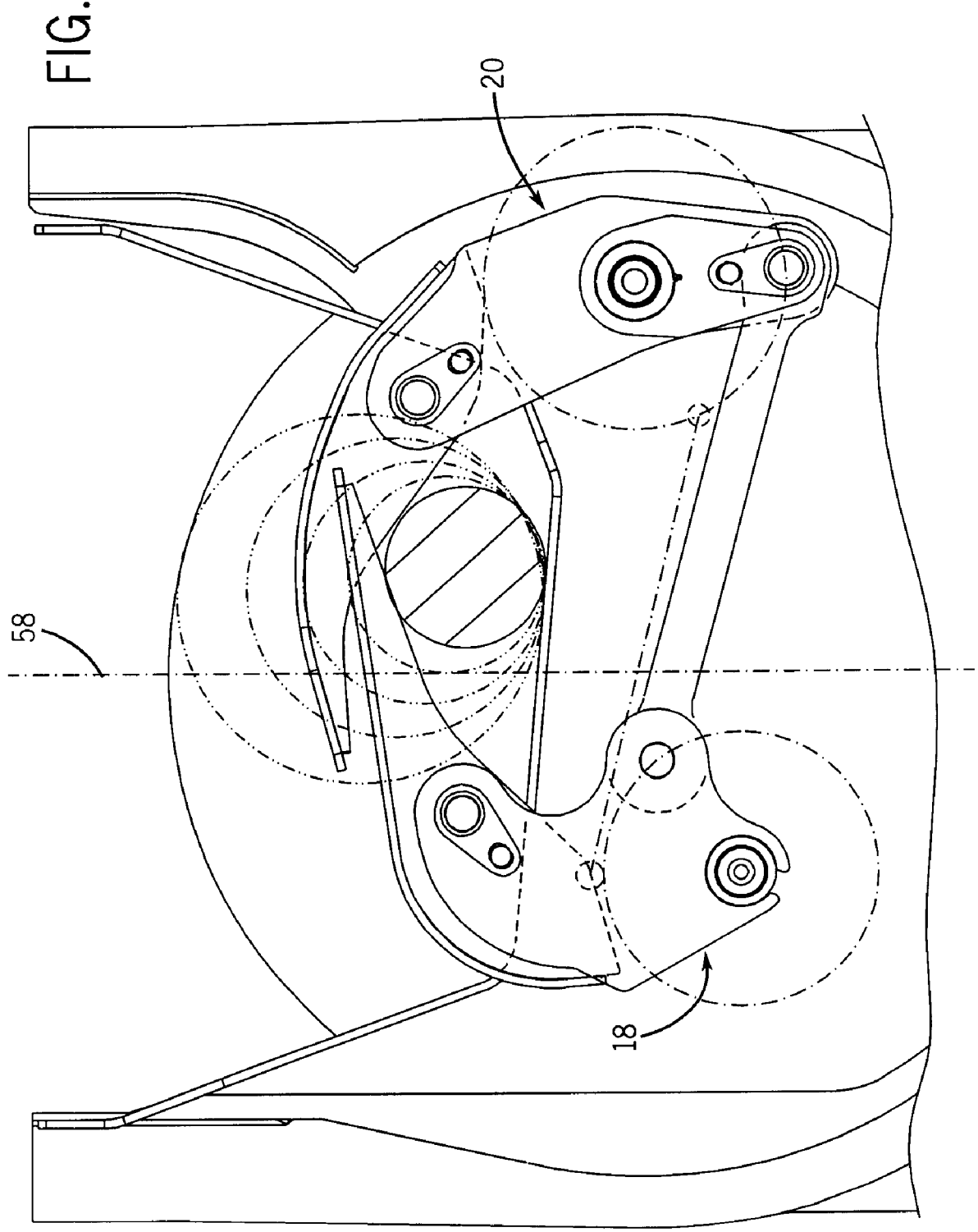

FIG. 10 shows the accumulating arms 18 and 20 closed around the largest of the tree sizes illustrated, which may be for example approximately 22 inches in diameter. The relatively straighter outer arm 18B tends to move the tree to the right and the curve of the outer arm 20B on the inner side of the arm 20B creates room so that the tree can move to the right. As stated above, the outer arm 18B can pivot relative to the inner arm 18A about axis 70, but cannot pivot outwardly further than as illustrated in FIG. 10, and its inward pivoting is limited by one or more springs (not shown, but commonly understood by persons skilled in the art). Similarly, outer arm 20B pivots about axis 72 relative to inner arm 20A but cannot pivot further outwardly than as illustrated in FIG. 10, and its inward pivoting is opposed by suitable springs (not shown, but commonly understood by those skilled in the art).

FIGS. 11-18 are views similar to FIGS. 9 and 10 but alternately showing the harvesting and accumulating arms closed about different sizes of the first tree to be cut. In these figures, it should be noted that the amount of space outside of the accumulating arms 18 and 20 and in the pocket is significantly greater on the left side of the forward axis 58 than it is on the right side. Arch 78 is the path of the tooth tips, so that is where cutting begins and ends. By shifting the space to the left, when the head 10 is driven forwardly through the tree, a larger tree can be cut for each size of first tree cut, or for a given number and size of trees held by the accumulator arms 18, 20. The pivot axis 40 of the arm 18 is also shifted rearwardly relative to where it otherwise would be, and also relative to axis 42 of arm 20, which helps create more room in front of the arm 18 for cutting a new tree when the arm 18 is holding a given size and number of trees. The pivot axis 44 of the arm 14 is also shifted rearwardly from where it otherwise would be, and also relative to axis 46 of arm 16, which helps arm 14 push trees in a direction more toward the accumulation zone of the head 10.

Figure 19:
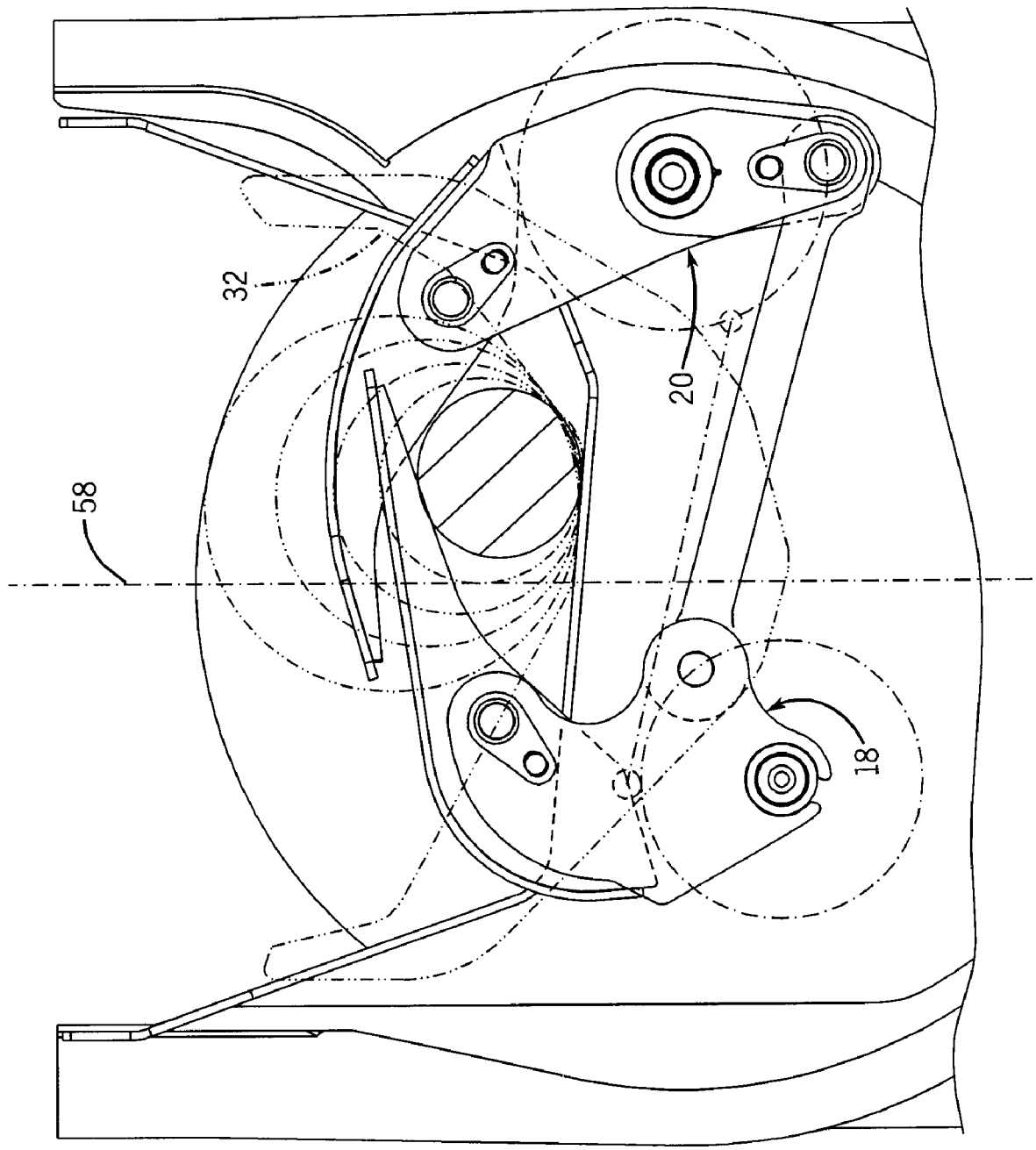
Figure 20:
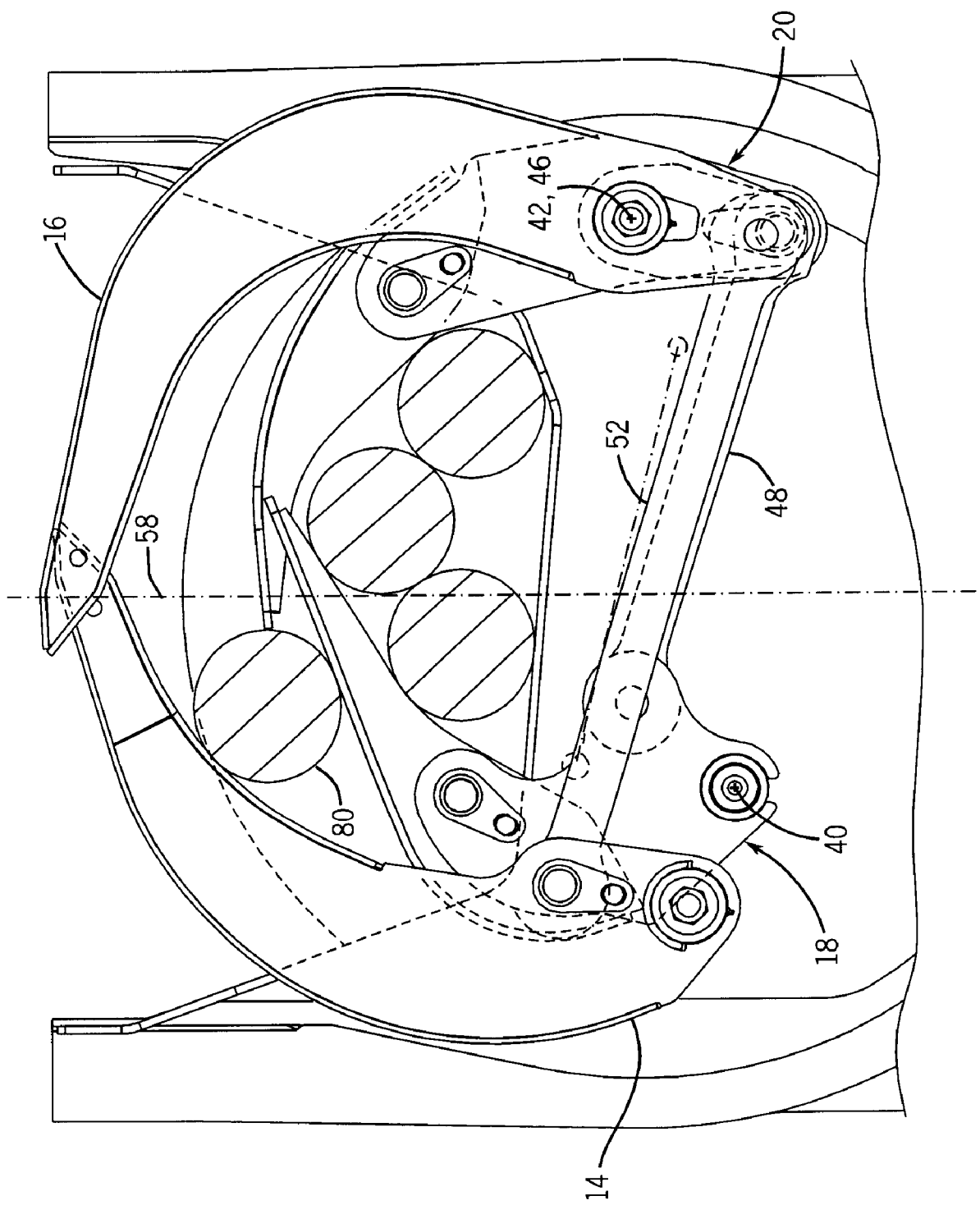
Figure 21:
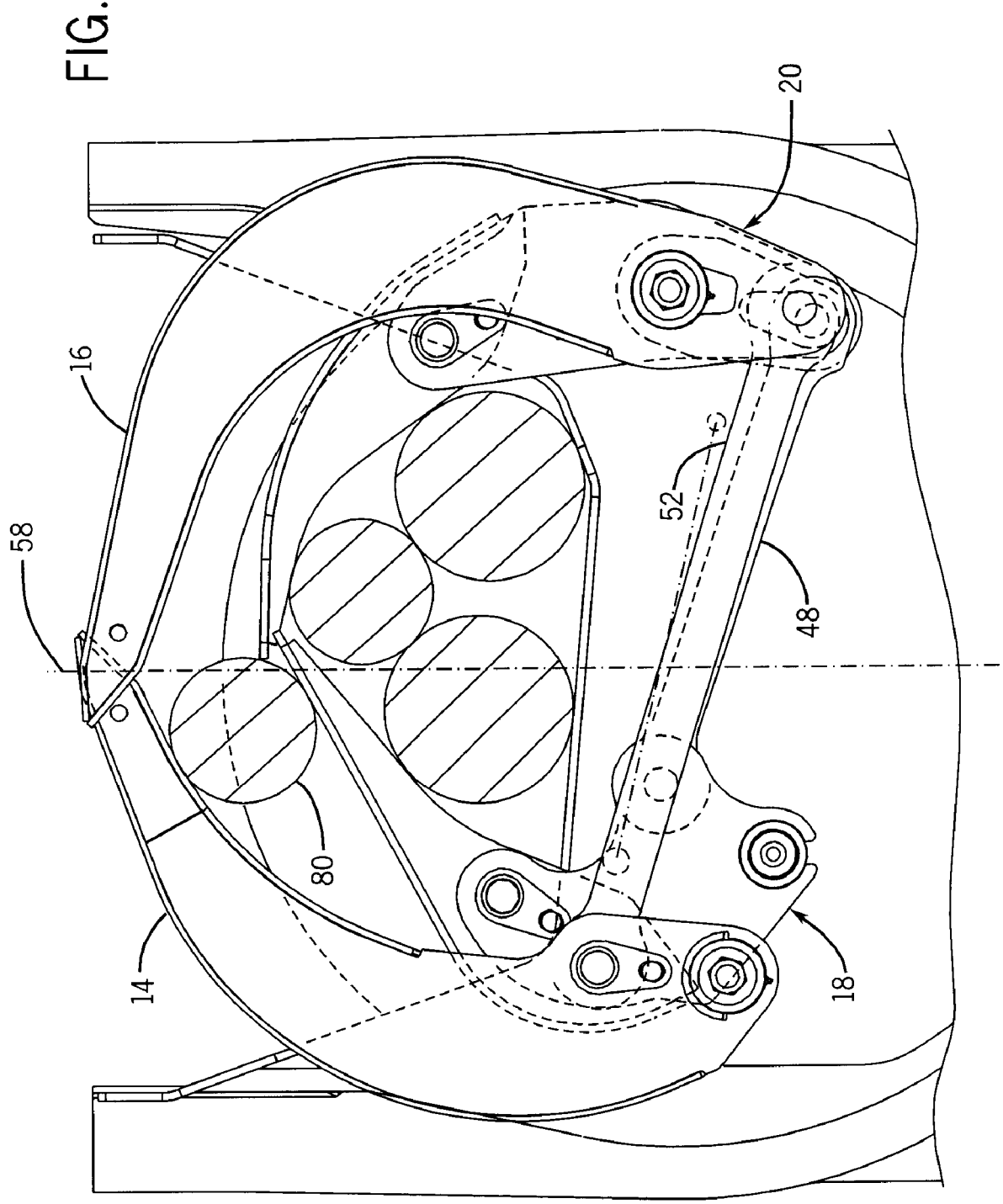

FIG. 19 shows the head with the horn 32 drawn in. FIGS. 20 and 21 show a bundle or bunch of three trees held by the accumulating arms and one additional tree being cut in the area between the outside of the accumulating arms and the inside of the harvesting arms. The operator of the head would cut the new tree to the left side of forward travel axis 58 as illustrated. The additional freshly cut tree 80 illustrated in FIG. 21 could be cut all the way through by withdrawing arms 18 and 20 before finishing the cut on tree 80, which would create room for the tree 80 to be drawn in to the bunch of already accumulated trees. The accumulating arms 18 and 20 are spaced a sufficient distance above the butt plate 28 so that the blade 26 will sever smaller trees without the need to open the accumulating arms. Since the center line of the bunch or bundle of trees held by the accumulating arms 18 and 20 is offset to the right of the axis 58, the harvesting arm 16 must be made with more curvature so that it goes forwardly further before it turns in, than would be the case if the bunch was centered relative to the head 10. Thus, the accumulating arms hold the bundle of trees so that the center or axis of symmetry of the accumulated tree(s) is to one side of the forward central axis of the head. This creates more room on the other side to cut the next tree, and allows accumulating more and bigger trees than other heads with centered accumulation.

It should be noted that this arrangement could be reversed to accumulate more trees to the left of the center line 58 than to the right, but this is not preferred since doing so may obstruct the vision of the driver to see the new tree being cut.

Preferred embodiments of the invention have been described in considerable detail. Many modifications and variations to the embodiments described will be apparent to those skilled in the art. Therefore, the invention should not be limited to the embodiments described, but should be defined by the claims that follow.

I claim:

1. In a front cut felling head for a feller buncher having a cutter and at least two accumulator arms for holding a bundle of one or more cut trees and at least two harvesting arms for moving a cut tree into an accumulation area to be held by the accumulator arms, each of the accumulator arms including an outer arm pivotally connected to an inner arm, the accumulator arms being pivotally mounted to a frame of the felling head on opposite sides of a forward longitudinal axis of the felling head, the forward longitudinal axis being directed in the direction of forward movement of the feller buncher and located centrally relative to the cutter of the head such that the cutter is fed through a tree to be cut parallel to the forward longitudinal axis, the improvement wherein a pivot point of one of said accumulator arms to the frame is further rearwardly than a pivot point of the other accumulator arm to the frame relative to the forward longitudinal axis of the head, such that a line drawn between the pivot axes of the two accumulator arms intersects the forward longitudinal axis of the felling head at an angle other than 90°.

2. The improvement of claim 1, wherein the accumulator arms are link synchronized.

3. The improvement of claim 1, wherein respective pivot axes of the harvesting arms are also offset from one another such that a line between the two pivot axes of the harvesting arms is at an angle other than 90° to the forward longitudinal axis of the felling head.

4. The improvement of claim 3, wherein the harvesting arms are link synchronized.

5. The improvement of claim 1, wherein the accumulator arms are non-symmetrical.

6. The improvement of claim 1, wherein the harvesting arms are non-symmetrical.

7. The improvement of claim 1, wherein pivot axes of the harvesting and accumulator arms on at least one side of the forward longitudinal axis of the head are non-coaxial.

8. The improvement of claim 1, wherein one of the arms of each pair of the harvesting arms and the accumulator arms on one side of the forward longitudinal axis of the head is more curved on an inner surface for holding trees than the other arm of the pair.

9. In a front cut felling head for a feller buncher having a cutter and at least two accumulator arms for holding a bundle of one or more cut trees and at least two harvesting arms for moving a cut tree into an accumulation area to be held by the accumulator arms, each of the accumulator arms including an outer arm pivotally connected to an inner arm, the accumulator arms being pivotally mounted at pivot points to a frame of the felling head on opposite sides of a forward longitudinal axis of the felling head, the forward longitudinal axis being directed in the direction of forward movement of the feller buncher and located centrally relative to the cutter of the head such that the cutter is fed through a tree to be cut parallel to the forward longitudinal axis, the improvement wherein one of the accumulator arms has a first shape to push trees toward the other of the accumulator arms, the other of the accumulator arms having a second shape, and the second shape being different from the first shape.

10. The improvement of claim 9, wherein one of the accumulator arms is more curved on a surface for holding the trees than the other accumulator arm.

11. The improvement of claim 10, wherein the accumulator arm with the more curved surface has a pivot point that is further forward relative to the forward longitudinal axis than a pivot point of the other accumulator arm.

12. The improvement of claim 9, wherein the arms of each pair are link synchronized.

13. The improvement of claim 9, wherein the felling head is a high speed disc saw felling head.

14. The improvement of claim 9, wherein the arms are non-symmetrical.

* * * * *